US012523756B1

United States Patent
Onorato et al.

(10) Patent No.: US 12,523,756 B1
(45) Date of Patent: Jan. 13, 2026

(54) AESA TRUE DUAL BEAM FULL RANGE, FULL DOPPLER SPECTRUM IMAGING WHILE SCANNING RADAR SYSTEM

(71) Applicant: Telephonics Corporation, Farmingdale, NY (US)

(72) Inventors: James Onorato, Lake Grove, NY (US); Lorenzo LoMonte, Huntington, NY (US); Justin Maloney-Hahn, Cazenovia, NY (US)

(73) Assignee: Telephonics Corporation, Farmingdale, NY (US)

( * ) Notice: Subject to any disclaimer, the term of this patent is extended or adjusted under 35 U.S.C. 154(b) by 1072 days.

(21) Appl. No.: 17/543,891

(22) Filed: Dec. 7, 2021

Related U.S. Application Data

(60) Provisional application No. 63/155,761, filed on Mar. 3, 2021.

(51) Int. Cl.
*G01S 13/66* (2006.01)
*G01S 13/91* (2006.01)

(52) U.S. Cl.
CPC ............. *G01S 13/66* (2013.01); *G01S 13/917* (2019.05)

(58) Field of Classification Search
CPC .............................. G01S 13/66; G01S 13/917
See application file for complete search history.

(56) References Cited

U.S. PATENT DOCUMENTS

| | | |
|---|---|---|
| 2,726,385 A | 12/1955 | Moore |
| 3,130,402 A | 4/1964 | Kuck |
| 3,182,309 A | 5/1965 | Hendry |
| 3,248,731 A | 4/1966 | Bickmore |
| 3,373,428 A | 3/1968 | Atlas |
| 3,380,052 A | 4/1968 | Drabowitch |
| 3,430,236 A | 2/1969 | Gamertsfelder |
| 3,713,163 A | 1/1973 | Keller |
| 3,715,749 A | 2/1973 | Archer |

(Continued)

FOREIGN PATENT DOCUMENTS

| | | |
|---|---|---|
| BE | 1019043 | 2/2012 |
| CN | 101029928 B | 2/2011 |

(Continued)

*Primary Examiner* — Jack W Keith
*Assistant Examiner* — Clayton Paul Ridder
(74) *Attorney, Agent, or Firm* — Thomas A. O'Rourke; James Bongiorno; O'Rourke IP Law, PLLC

(57) ABSTRACT

A radar system accomplishes imaging and simultaneous scanning, and includes: dual waveform generators, beam formers, and phase shifters, and a shared transmit/receive module at each antenna element. The first waveform generator generates a first frequency that's constituted into a first radar beam by the first beam former then steered by the first phase shifter followed by the transmit/receive module sending a high power signal in the direction of the target being imaged. A second waveform generator generates a second frequency that's constituted into a second beam by the second beam former, steered by the second phase shifter, and transmitted by the same T/R/module, using sequential timing to provide a scanning beam of the surveillance area. On receive, the common T/R module drives the respective phase shifters, the beam formers to form the respective beams, including the beam staring at the target being imaged, and the beam performing surveillance.

20 Claims, 8 Drawing Sheets

(56) References Cited

U.S. PATENT DOCUMENTS

| | | |
|---|---|---|
| 3,754,270 A | 8/1973 | Thies |
| 3,761,936 A | 9/1973 | Archer |
| 4,028,708 A | 6/1977 | Woodward |
| 4,034,374 A | 7/1977 | Kruger |
| 4,053,883 A | 10/1977 | Greene |
| 4,080,605 A | 3/1978 | Hilton |
| 4,197,540 A | 4/1980 | Riggs |
| 4,277,787 A | 7/1981 | King |
| 4,355,311 A | 10/1982 | Jain |
| 4,408,205 A | 10/1983 | Hockham |
| 4,429,311 A | 1/1984 | Barewald |
| 4,558,324 A | 12/1985 | Clapp |
| 4,687,281 A | 8/1987 | Gross |
| 4,951,059 A | 8/1990 | Taylor |
| 4,965,602 A | 10/1990 | Kahrilas |
| 5,257,031 A | 10/1993 | Scarpetta |
| 5,557,282 A | 9/1996 | Mertens |
| 5,576,721 A | 11/1996 | Hwang |
| 5,781,157 A | 7/1998 | Laird |
| 5,909,191 A | 6/1999 | Hirschfield |
| 6,043,772 A | 3/2000 | Voightlaender |
| 6,078,289 A | 6/2000 | Manoogian |
| 6,104,343 A | 8/2000 | Brookner |
| 6,222,479 B1 | 4/2001 | Honigsbaum |
| 6,424,319 B2 | 7/2002 | Ebling |
| 6,462,700 B1 | 10/2002 | Schmidt |
| 6,606,077 B2 | 8/2003 | Ebling |
| 6,633,253 B2 | 10/2003 | Cataldo |
| 6,714,157 B2 | 3/2004 | Wittenberg |
| 6,768,456 B1 | 7/2004 | Laiezari |
| 7,420,504 B1 | 9/2008 | Held |
| 7,468,690 B2 | 12/2008 | Green |
| 7,675,458 B2 | 3/2010 | Hubbard |
| 7,834,803 B2 | 11/2010 | Weinstein |
| 7,961,140 B2 | 6/2011 | Binzer |
| 7,994,996 B2 | 8/2011 | Reibeiz |
| 8,552,905 B2 | 10/2013 | Jin |
| 8,558,735 B2 | 10/2013 | Bachmann |
| 8,698,668 B2 | 4/2014 | Hellsten |
| 9,019,144 B2 | 4/2015 | Calabrese |
| 9,201,141 B1 | 12/2015 | Manickam |
| 9,479,232 B1* | 10/2016 | Loui ............... H04B 7/0617 |
| 9,638,799 B2 | 5/2017 | Goodwin |
| 10,203,405 B2 | 2/2019 | Mazzaro |
| 10,340,601 B2 | 7/2019 | Henry |
| 10,432,283 B2 | 10/2019 | Rainish |
| 10,605,911 B1 | 3/2020 | Parker |
| 10,775,498 B2 | 9/2020 | Vacanti |
| 10,965,039 B1 | 3/2021 | Chandler |
| 11,119,209 B2 | 9/2021 | Sharanov |
| 11,555,916 B2* | 1/2023 | Reynolds ......... G01S 13/9004 |
| 2005/0001265 A1 | 1/2005 | Lalezari |
| 2007/0285315 A1* | 12/2007 | Davis ............... H01Q 21/22 |
| | | 342/377 |
| 2010/0214171 A1* | 8/2010 | Quan ............... H01Q 21/06 |
| | | 342/374 |
| 2013/0154899 A1 | 6/2013 | Lewis |
| 2018/0252807 A1 | 9/2018 | Fox |
| 2019/0101639 A1 | 4/2019 | Rincon |
| 2019/0129026 A1* | 5/2019 | Sumi ............... G01S 7/52041 |
| 2019/0257940 A1 | 8/2019 | Sharanov |
| 2020/0348412 A1 | 11/2020 | Furham |

FOREIGN PATENT DOCUMENTS

| | | |
|---|---|---|
| CN | 201812036 | 4/2011 |
| CN | 102157787 | 8/2011 |
| CN | 102169180 | 8/2011 |
| CN | 102023293 | 6/2013 |
| CN | 103245939 | 8/2013 |
| CN | 103278809 | 9/2013 |
| CN | 104280733 | 1/2015 |
| CN | 104931936 | 9/2015 |
| CN | 104992519 | 10/2015 |
| CN | 103645471 | 1/2016 |
| CN | 104133216 | 6/2016 |
| CN | 107728139 A | 2/2018 |
| CN | 110221299 A | 9/2019 |
| CN | 110618403 A | 12/2019 |
| CN | 110940983 A | 3/2020 |
| CN | 110988858 A | 4/2020 |
| CN | 111090094 A | 5/2020 |
| CN | 111190184 A | 5/2020 |
| CN | 210626651 U | 5/2020 |
| CN | 111864385 A | 10/2020 |
| CN | 211741559 U | 10/2020 |
| CN | 113161743 A | 7/2021 |
| EP | 0132378 B1 | 1/1990 |
| EP | 0407243 A1 | 1/1991 |
| EP | 0640844 A1 | 3/1995 |
| EP | 1523785 B1 | 5/2012 |
| EP | 2359159 B1 | 5/2019 |
| FR | 2810799 A1 | 12/2001 |
| GB | 2382228 A | 5/2003 |
| JP | H08240661 | 9/1996 |
| JP | 2011237337 | 11/2011 |
| JP | 6710701 B2 | 6/2020 |
| KR | 970075945 | 12/1997 |
| KR | 100654588 B1 | 1/2007 |
| KR | 20070029294 | 3/2007 |
| KR | 20130129591 | 11/2013 |
| KR | 101779900 | 9/2017 |
| RU | 2298267 C1 | 4/2007 |
| WO | WO1986007467 A1 | 12/1986 |
| WO | WO2006063915 A1 | 6/2006 |
| WO | WO2009021768 A1 | 6/2008 |
| WO | WO2014094106 A1 | 6/2014 |
| WO | WO2018217902 A1 | 11/2018 |

* cited by examiner (ISAR Prioritization)

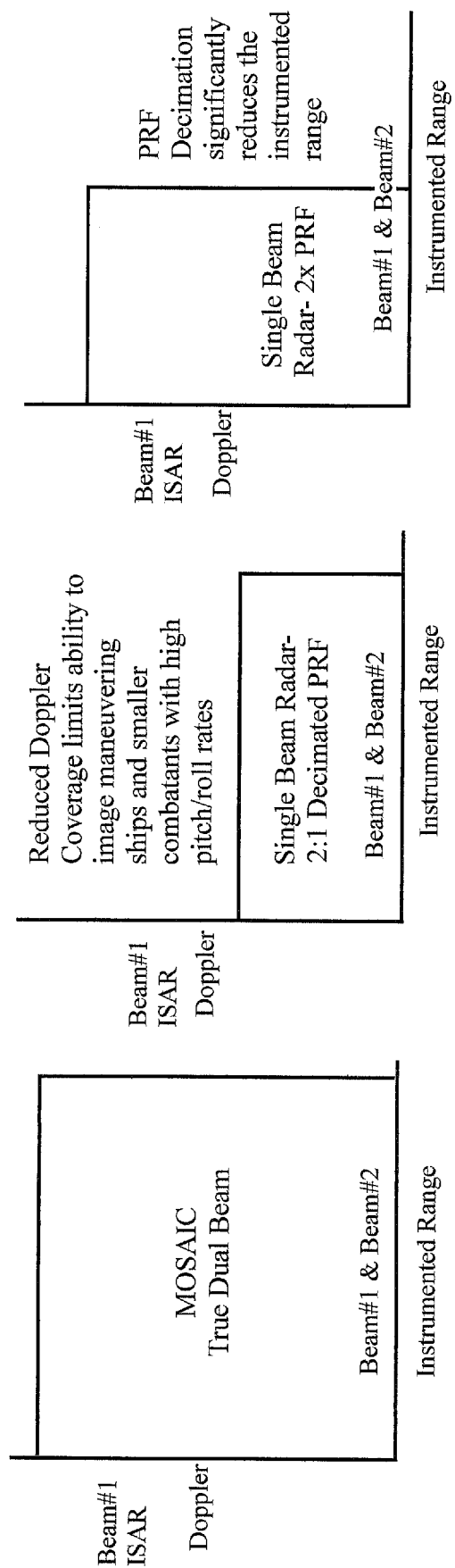

(SAR Mode- Spotlight)

(SAR Mode- Scan)

(SAR Mode- Strip Map)

AESA TRUE DUAL BEAM FULL RANGE, FULL DOPPLER SPECTRUM IMAGING WHILE SCANNING RADAR SYSTEM

CROSS REFERENCES TO RELATED APPLICATIONS

This application claims priority on U.S. Provisional Application Ser. No. 63/155,761 filed on Mar. 3, 2021, the disclosures of which are incorporated herein by reference.

FIELD OF THE INVENTION

The present invention relates generally to improvements in radar systems, and more particularly to a radar system that is configured with a particular dual beam arrangement that permits simultaneous scanning and imaging.

BACKGROUND OF THE INVENTION

A Radio Detecting and Ranging (RADAR) system generally consists of a transmitter used to produce an electromagnetic signal (e.g., radio waves), an antenna configured to radiate that signal in a particular direction or directions and to receive (i.e., "detect") the signal after it has been reflected back to the system by an object, a receiver designed to receive and analyze the reflected signal, and a duplexer that alternately switches the antenna between the transmitter and receiver, which permits only one antenna to be used, and forms a monostatic system. The received signal will have traveled for a time period that is proportional to the distance of the object from the antenna (i.e., the "ranging"). The radar return signal is used to produce a "map" of the target. Conventional radar systems had typically utilized mechanical beam steering apparatus, which had several inherent disadvantages that were overcome by the development of electronic scanning antennas (ESAs), which are also known as phased array radars. ESAs have transmitter and receiver functions implemented by numerous small transmit/receive (T/R) modules that eliminate the need for physical rotation. However, even these radar systems have other drawbacks and limitations.

In a Real Aperture Radar (RAR) system, a beam is transmitted perpendicularly to the direction of movement of the platform (i.e., transmitted in the range direction), which moving platform may be a plane, satellite, etc. The relative intensity of the reflected signals may be used to produce an image of a narrow strip of terrain (see FIG. 8A). Sequential strips of terrain are positioned side by side in the azimuth direction (parallel to the direction of movement) to build a two dimensional image array. However, size limitations for the antenna on the moving platform limit the spatial resolution that may be obtained in the azimuth direction in accordance with the azimuth beamwidth, and which generally provides an insufficient azimuth resolution.

Synthetic aperture radar (SAR) was developed to mitigate the poor azimuth resolution of a real aperture radar. In a SAR radar system the motion of the antenna in the azimuth direction is utilized (i.e., "synthetized") to provide the effect of using a long antenna. Essentially, advanced processing algorithms synthesize the cumulative aperture capability of a small moving antenna to generate the resulting azimuth resolution that would otherwise be achieved by the aperture of a large antenna. The distance that a platform moves (i.e., the distance that an aircraft flies) while "synthesizing" the antenna forms the synthetic aperture of the radar system. A narrow synthetic beam width is the result of a relatively long synthetic aperture, and produces finer azimuthal resolution than may be achieved from a smaller physical antenna.

In an advanced radar system, as shown for example by U.S. Pat. No. 7,420,504 to Held, a synthetic aperture radar mode as well as a surface or ground moving target indicator (MTI) mode are accomplished using an active electronically scanned array (AESA) multi-beam radar, with a single aperture (i.e., one antenna). In the "multibeam" radar of the '504 patent to Held, "respective transmit pulses and beam returns are received by respective receive windows." Held also teaches that "a range of pulse repetition frequencies and pulse repetition frequency change rates are used in an iterative process to determine non-collision alignments of any combination of transmit pulses and receive windows," and when "a non-collision alignment is determined the particular arrangement producing that non-collision alignment is used in a simulated flight of the platform to determine dwell time before a collision occurs." The Held invention seeks an "arrangement that produces sufficient dwell time to accomplish a mission" when "used in an actual flight of the platform."

However, while the "multibeam radar" of Held may be "carried on a platform flying a mission over a prescribed flight path to obtain images of a plurality of target areas," the described "beams of the radar" are "the result of respective transmit pulses and beam returns being received by respective receive windows." The Held apparatus uses one beam that can be quickly switched on receive to different beam positions. In effect, multiple beams are interlaced in time with each beam pointing in the desired direction. However, with the Held apparatus it is "imperative to avoid any collisions, where a collision is defined as the simultaneous time occurrence of any combination of transmit pulses and receive windows." This method assumes the receive time is small, meaning a small range swath is processed for each beam position, which places constraints on the platform location and orientation to insure the received signals don't arrive at the same time (see also, U.S. Pat. No. 7,468,690 to Green; U.S. Pat. No. 9,201,141 to Manickam; and U.S. Pat. No. 10,605,911 to Parker).

Thus, the current state of the art requires beam time sharing between multiple radar modes, e.g., an alternating sequence-surveillance/imaging/surveillance/imaging . . . (note that even with Inverse Synthetic Aperture Radar (ISAR) systems, i.e., using the movement of the target rather than the emitter to create the synthetic aperture, up to 60 seconds may be needed to obtain the best image for classification purposes based on a ship's pitch/roll/yaw cycle). So with current radar systems, there may be no surveillance being performed during the 60 second imaging dwell. Therefore, scanning, detecting, and tracking targets is not available, which results in potential track loss, as well as delayed acquisition of new contacts, which greatly increases operator workload especially in dense target environment.

The herein disclosed system provides improvements upon such radar systems, by providing a system that permits imaging while scanning (IWS) using true dual simultaneous beams, thereby eliminating that problem, as it is able to continuously track targets, including following maneuvering targets while simultaneously producing ISAR images for classification purposes.

The radar system disclosed herein is therefore highly applicable to Maritime Surveillance Customers who will use Simultaneous Long Range Search (LRS) and Inverse Synthetic Aperture Radar. The radar system disclosed herein is also highly applicable to Overland Surveillance Customers who will use Simultaneous Ground Moving Target Indicator (GMTI) and Synthetic Aperture Radar.

In addition, the herein disclosed IWS radar system for Maritime Surveillance enables the development of an Autonomous Anti-Surface Warfare (ASuW) capability using Inverse Synthetic Aperture Radar (ISAR), Automated Identification System (AIS) and other sensors such as Fusion of Radar and Electro-Optical/Infrared (EO/IR) for Ship Classification and Identification, and Electronic Support Measures (ESM).

Therefore, the herein disclosed IWS radar system is particularly advantageous in dense target environments consisting of military and commercial vessels, and can be extended to overland users/customers who need simultaneous SAR and Ground Moving Target Indication (GMTI).

OBJECTS OF THE INVENTION

It is an object of the invention to provide an active electronically scanned array with true simultaneous multibeam operations.

It is another object of the invention to provide a radar that uses one beam to scan a surveillance area, detect new targets and update tracks on existing targets, and which uses a second beam to dwell on a target (ISAR) or region (SAR) for classification purposes.

It is also an object of the invention to provide a scheduler apparatus that selects the operating frequency of each beam of the dual beam radar, and which prioritizes and selects the target or region to be imaged.

It is a further object of the invention to provide a timing synchronization function for a multibeam radar system that can insure that two beams transmit and receive without interfering with each other.

It is another object of the invention to provide a radar system that can synthesize multiple beams on receive using element level RF beam forming with element level dual beam phase/amplitude control.

It is also an object of the invention to provide a radar system that continuously tracks targets, including following maneuvering targets while simultaneously producing ISAR images for classification purposes.

It is another object of the invention to provide automatic classification of vessels using ISAR Mode (Spotlight Imaging) without interrupting the Search Mode, using a technique and particular hardware arrangement that employs two phases shifters for each transmitter/receiver (and antenna) allowing sequential transmission for each Mode in two different directions, thereby maintaining both Imaging Doppler Bandwidth and Max Range.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, an active electronically scanned array (AESA) is a phased array, and AESAs are known to perform mutually-exclusive radar modes using a fast-switching single beam. This is a vital issue, as many radar customers need the concomitant use of Automatic Target Recognition (ATR) and Search, and a solution to this long felt but unmet need is disclosed herein to satisfy the requirement.

An approach of physically doubling the RF beams, as disclosed herein, is compared with other AESAs approaches that claim to perform simultaneous modes using beam switching from pulse-to-pulse.

In the following comparison, the prior art AESAs are assumed to be capable of changing the states of its transmit-receive (T/R) module phase shifters instantaneously, although real-world technology will further limit any beam-switching in the order of microseconds.

It is assumed that the objective is to perform joint Search and Imaging modes. To guarantee coherent processing, pulses for both the Search and the Imaging mission must be sent out at an equal, common interval, i.e., the pulse repetition interval (PRI).

From a Search perspective, the PRI effectively dictates its maximum range.

From an Imaging perspective, it is the PRF, i.e., the inverse of PRI, which dictates:
  The SAR cross-range image size (the higher the PRF, the higher the cross-range size)
  The maximum speed of the platform (there exists a minimum PRF to prevent ambiguous image formation for a given antenna size)
  The maximum vertical extent of an ISAR image, particularly at higher sea states or larger vessels (the higher the PRF, the higher the vertical extent).

Without a true dual beam, the other systems are forced to interleave one pulse for Search and the next pulse for Imaging. As illustrated in FIGS. 4-7, these AESAs could devise two approaches:
  Keeping the original PRI unchanged, and interleaving pulses between Search and Image beams. In this case (see FIG. 4 and FIG. 6), while the maximum range may be preserved (PRI is unchanged), the maximum Doppler for the image beam is effectively reduced by two, because only one in two pulses (i.e., 2×PRI→PRF/2) is used for imaging. Without any precaution, this leads to aliased regions in both SAR and ISAR. The effect is aggravated in smaller antennas or faster platforms.
  Sending two pulses sequentially in the Search and Image beams within the original PRI. In this case (see FIG. 5 and FIG. 7), within a PRI, half of its time must be dedicated to listening to the Image mode, the amount of range extent covered by the Search mode is therefore effectively cut by half. This approach keeps the PRF unchanged for SAR/ISAR, thus not degrading the imaging mode. However, the maximum range for both Imaging and Search is effectively halved.

The true dual beam radar system disclosed herein is therefore configured to image with a first beam and to simultaneously scan with a second beam. The dual beam radar system includes: a first waveform generator, a first beam former, and a first transmit/receive module. The first waveform generator generates a first frequency that is constituted into a first radar beam by the first beam former. The first transmit/receive module includes: an electronic scanning antenna; first phase shifter to control a phase of the first radar beam; and a transmitter/receiver that transmits the phase-shifted first radar beam to the electronically scanned antenna to spotlight on the area being imaged.

A second waveform generator, second beam former, and second transmit/receive module with independent phase shifting are similarly formed for scanning of a second radar beam used for surveillance.

A first beam receiver is configured to receive a radar return from the electronic scanning antenna of the first transmit/receive module used for imaging; and a second beam receiver configured to receive a radar return from the electronic scanning antenna of the second transmit/receive module used for surveillance.

Also, a first transmit/receive switch is configured to control transmissions and receptions between the electronic scanning antenna of the first transmit/receive module and each of the first waveform generator and the first beam receiver; while a second transmit/receive switch is configured to control transmissions and receptions between the electronic scanning antenna of the second transmit/receive module and each of the second waveform generator and the second beam receiver.

BRIEF DESCRIPTION OF THE DRAWINGS

FIG. 3 is a chart showing the Doppler coverage and the Instrumented Range that may be achieved with the dual beam arrangement of FIG. 1.

FIG. 4 is a chart showing the reduction in Doppler Coverage for a single beam arrangement at the same instrumented range as the system of FIG. 3, which limits its ability to image maneuvering ships and smaller combatants with high pitch/roll rates.

FIG. 5 is a chart showing the reduction in instrumented range for a single beam arrangement with the same Doppler Coverage as the system of FIG. 3.

DETAILED DESCRIPTION OF THE INVENTION

As used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that the citing of any reference within this disclosure, i.e., any patents, published patent applications, and non-patent literature, is not an admission regarding a determination as to its availability as prior art with respect to the herein disclosed and claimed method/apparatus.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Figure 1:
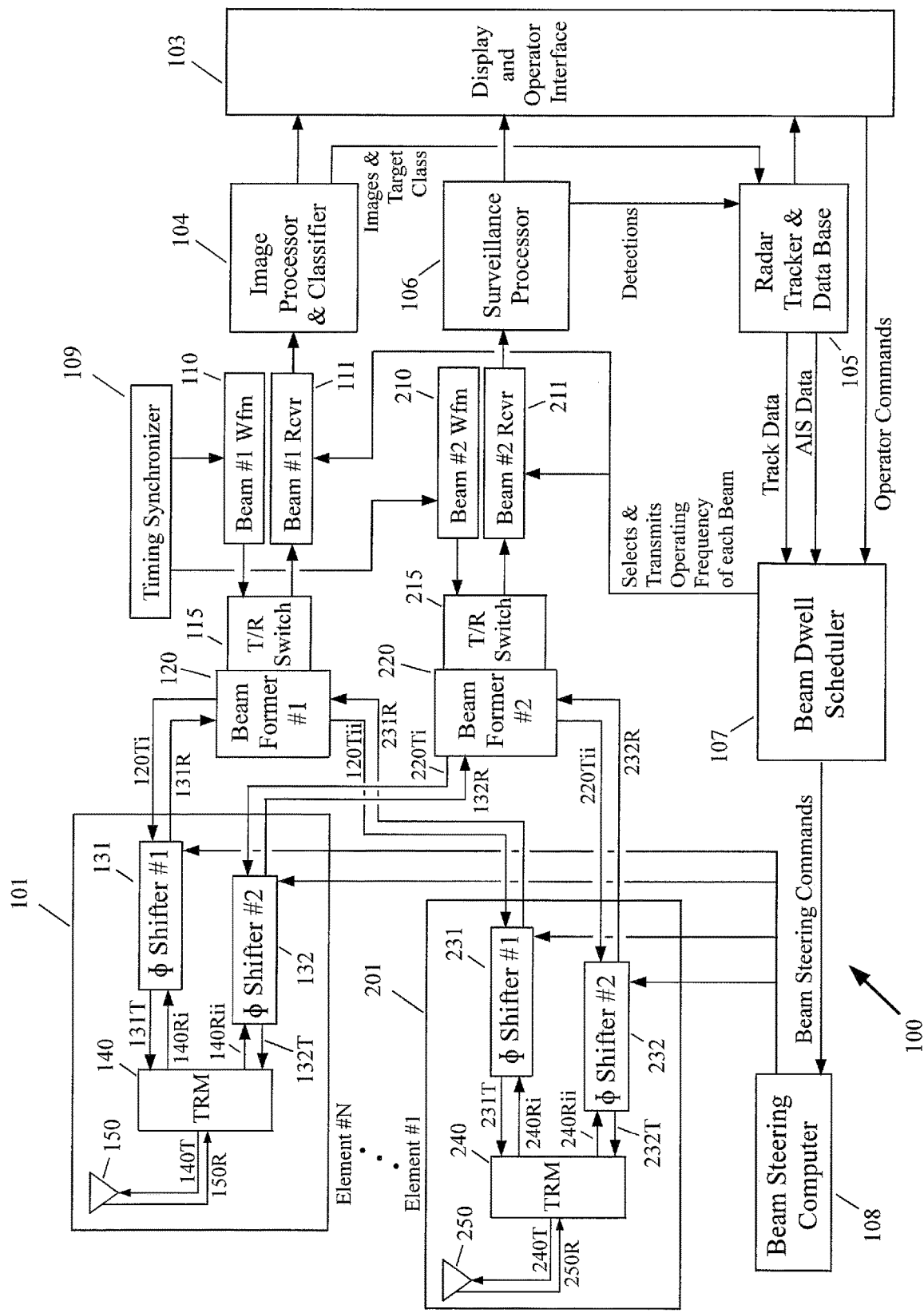
FIG. 1 is a functional block diagram of the herein disclosed radar system with dual simultaneous beams for imaging while scanning.

FIG. 1 shows a functional block diagram representing a portion of the herein disclosed dual simultaneous beam radar system 100, which is described hereinafter. Note however that the block diagram shows a simplified one-dimensional arrangement of elements, i.e., a dotted line indicating that there are N elements, which is representative of a 1-dimensional array—Azimuth only. In actual practice the elements are formed into a 2-Dimensional array allowing beamforming in both Azimuth and Elevation; however, it would be very complex to represent in a diagram for both Azimuth and Elevation, as there are N×M elements. Depending on the array size, in one embodiment, there may be N ranges being from 24 to 48 and M ranges being from 8 to 16. The same equation discussed hereinafter with respect to steering in the azimuth direction is used to also steer in elevation. Also note that the functional block diagram only shows two elements (i.e., two transmit/receive modules 101 and 201), but a plurality of such elements may be used (i.e., element #1, element #2, ... element #n).

The radar system 100 utilizes a first waveform generator 110 to generate a particular frequency for a first beam that is transmitted to, and constituted by, a first beam former 120. The first beam former 120 is coupled to transmit the beam to a first phase shifter 131 of a first transmit receive module 101 (i.e., ϕ Shifter #1 of transmit/receive module 101 in FIG. 1), and to receive transmissions therefrom. The first transmit/receive module 101 also includes a transmitter 140 that is coupled to the first phase shifter 131 for transmitting thereto and receiving therefrom, and is also coupled to an electronic scanning antenna 150 for transmission thereto and reception therefrom.

The radar system 100 also uses a second waveform generator 210 to provide a particular frequency for a second beam that is transmitted to, and constituted by a second beam former 220. The second beam former 220 is coupled to transmit that beam to a phase shifter 232 in a second transmit/receive module 201 (i.e., ϕ Shifter #2 of transmit/receive module 201 in FIG. 1) and to receive transmissions therefrom. The second transmit/receive module 201 also includes a transmitter 240 that is coupled to the phase shifter 232 for transmitting thereto and receiving therefrom, and is also coupled to an electronic scanning antenna 250 for transmission thereto and reception therefrom.

A Timing Synchronizer 109 synchronizes the waveform generation by the first waveform generator 110 of the first transmit/receive module 101 and the second waveform generator 210 in the second transmit/receive module 201, to insure that the two beams can be transmitted and received without interfering with each other.

In addition, the first transmit/receive module 101 also includes another phase shifter 132 (i.e., ϕ Shifter #2 of transmit/receive module 101 in FIG. 1) that is configured for bidirectional communication (transmissions and receptions) with respect to the second beam former 220 and also with respect to the transmitter 140.

In addition, the second transmit/receive module 201 also includes another phase shifter 231 (i.e., ϕ Shifter #1 of transmit/receive module 201 in FIG. 1) that is configured for bidirectional communication (transmissions and receptions) with respect to the first beam former 120 and also with respect to the transmitter 240.

A transmit/receive switch 115 controls the transmissions from the first waveform generator 110 to the first beam former 120, and the transmissions transmitted to a first beam receiver 111 from the first beam former 120.

A transmit/receive switch 215 controls the transmissions from the second waveform generator 210 to the second beam former 220, and the transmissions transmitted to a second beam receiver 211 from the second beam former 220.

The first beam receiver 111 is coupled to transmit images to an Image Processor and Classifier 104, which in turn is coupled to transmit processed images to a Display and Operator Interface 103. The Image Processor and Classifier 104 also transmits images and target classifications to a Radar Tracker and Data Base 105. Image processing takes high range resolution signals and performs Doppler Processing to lock into the mean ship range rate and then measure the rotational motion of scatters as the ship pitches, rolls and yaws to form an ISAR Image.

The second beam receiver 211 is coupled to transmit to a Surveillance Processor 106, which transmits a PPI Display. The Surveillance Processor 106 is coupled to transmit to the Display and Operator Interface 103. The Surveillance Processor 106 also transmits detections to the Radar Tracker and Data Base 105. Detections may be single scan/dwell measurements of targets and/or false alarms from noise and clutter. The Radar Tracker and Data Base 105 filters these measurements and removes the false alarms via scan to scan integration and tracking.

The Radar Tracker and Data Base 105 is also coupled to transmit to the Display and Operator Interface 103, and is furthermore coupled to transmit track data and AIS data to a Beam Dwell Scheduler 107.

The Display and Operator Interface 103 also transmits operator commands to the Beam Dwell Scheduler 107. The operator may utilize the Display and Operator Interface 103 to select and track a particular object for ISAR Imaging, rather than waiting for the Beam Dwell Scheduler 107 to make automatic scheduling that selects the track.

The Beam Dwell Scheduler 107 transmits beam steering commands to the Beam Steering Computer 108, which provides inputs to each of the phase shifter 131 and phase shifter 132 of transmit/receive module 101, and to each of the phase shifter 231 and the phase shifter 232 in the second transmit/receive module 201. The Beam Dwell Scheduler 107 selects the operating frequency of each beam, and transmits frequency inputs to each of the first beam receiver 111 and the second beam receiver 211. The Beam Dwell Scheduler 107 also prioritizes and selects the target or region to be imaged. The search beam operates according to a preplanned schedule and scans all azimuth angles with a defined revisit time. The ISAR beam is controlled via the automatic scheduling set by the Beam Dwell Scheduler 107, one target at a time, and also accommodates manual requests by the operator when the operator selects a track to image.

The dual simultaneous beam active electronically scanned array of the radar system 100 provides one beam to dwell on a target (ISAR) or region (SAR) for classification purposes and also provides a second beam to scan a surveillance area, detect new targets and update tracks on existing targets.

During operation of these system components, a phased array of two beams is transmitted and received, whereby one beam is used to scan a surveillance area, detect new targets and update tracks on existing targets, and the second beam may dwell on a target (ISAR) or on a region (SAR) for classification purposes. The process is generally as follows.

1. A first beam is generated by the first waveform generator 110 and the first beam former 120.

2. A second beam is generated by the second waveform generator 210 and the second beam former 220.

3. The first beam former 120 transmits the first beam 120Ti to the first phase shifter 131 in the first transmit/receive module 101, and may transmit the beam 120Tii to the first phase shifter 231 in the second transmit/receive module 201.

4. The second beam former 220 transmits the second beam 220Ti to the second phase shifter 132 in the first transmit/receive module 101, and may transmit the beam 220Tii to the second phase shifter 232 in the second transmit/receive module 201.

5. The timing synchronizer 109 provides a timing synchronization function to each of the first waveform generator 110 and the second waveform generator 210 to ensure that the two beams are transmitted and received without interfering with each other. This is discussed below in more detail.

6. The first and second phase shifters 131/132 of first transmit/receive module 101, and the first and second phase shifters 231/232 of the second transmit/receive module 201 create a phased array of the beams (beams 131T, 132T, 231T, and 232T) in a desired azimuth direction (ΘAz) and a desired elevation direction (ΘEl) by setting a linear phase gradient across the synthetic aperture such that a phase difference (Δphase) between the elements from the adjacent transmit/receive modules 101/201 is according to:

$$\Delta\text{phase } x \text{ axis}, Az = 2\pi dAz/\lambda (\sin(\Theta))(\cos(\Phi))$$

and $$\Delta\text{phase } y \text{ axis}, El = 2\pi dEl/\lambda \sin(\Theta)(\sin(\Phi))$$

where:
Θ=Angle of scan measured from broadside
Φ=Angle in plane of scan measured from x axis
dAz=x axis, azimuth element spacing
dEl=y axis, elevation element spacing
λ=wavelength 7. Summing the phase shifted beams (131T and 132T) from the beam shifters 131/132 in the first transmit/receive module 101 using a transmitter 140.

8. Summing the phase shifted beams (231T and 232T) from the beam shifters 231/232 in the second transmit/receive module 201 using a transmitter 240.

9. Scanning the summed and phase shifted beam 140T from the transmitter 140 across a field of regard using an electronic scanning antenna 150 in order to scan a surveillance area, detect new targets and update tracks on existing targets; and simultaneously scanning the summed and phase shifted beam 240T across a field of regard using an electronic scanning antenna 250 to dwell on a target (ISAR) or region (SAR) for classification purposes, so two signals may be transmitted in two different directions for two different purposes (e.g., to provide an uninterrupted full range search mode while simultaneously performing an imaging mode on a previously detected target).

10. Receiving a return signal at antenna 150, and transmitting the return signal 150R through the transmitter 140 to the phase shifter 131 and phase shifter 132 as signals 140Ri and 140Rii, respectively, and transmitting the return signal 131R from the phase shifter 131 to the beam former 120; and transmitting the return signal 132R from the phase shifter 132 to the beam former 220.

11. Receiving a return signal at antenna 250, and transmitting the return signal 250R through the transmitter 240 to the phase shifter 231 and phase shifter 232 as signals 240Ri and 240Rii, respectively, and transmitting the return signal 231R from the phase shifter 231 to the beam former 120; and transmitting the return signal 232R from the phase shifter 232 to the beam former 220.

12. Using the transmit/receive switch 115 to transmit the received signals 131R and 231R from the beam former 120 to the beam receiver 111, and be sequenced with respect to transmission of the beam generated by the first waveform generator 110 to the first beam former 120.

13. Using the transmit/receive switch 215 to transmit the received signals 132R and 232R from the beam former 220 to the beam receiver 211, and be sequenced with respect to transmission of the beam generated by the second waveform generator 210 to the second beam former 220.

14. The first beam receiver 111 transmits the received image signal to the Image Processor & Classifier 104. (Note that when operating the radar system 100 as an inverse synthetic aperture radar (ISAR) which uses the motion of the target to create the synthetic aperture, the system transmits a high range resolution coherent signal on one beam in a search mode-staring at the target, and a lower resolution full range search signal on the other beam). The Image Processor takes several seconds of the high range resolution coherent signal and produces a focused Range/Doppler image of the target in the form of a movie, which provides a continuous view of the target as it goes through its pitch/roll/yaw cycle, which can take up to 30 seconds. The best images for classification are the profile views which require bow or stern aspect angles in conjunction with target pitch motion. As the movie is generated the best images for classification are at the middle of the pitch cycle where the most linear motion is observed which produces maximum Doppler. The ISAR movie is transmitted to the Display and Operator Interface 103 for the operator to view for manual classification. Automatic classification may be performed by a device called a Maritime Classification Aid (MCA), which takes the ISAR movie and automatically extracts the best images for classification by looking at the Doppler Extent plus other attributes. Those best images are then processed to find features like the super structure locations, length at the water line, etc., and these features are then compared to a data base of 1700+ ship templates, and the best match is determined.

15. The second beam receiver 211 transmits the received image signal to the Surveillance Processor 106. The Surveillance Processor 106 performs automatic detection and tracking of the Search Beam signal, and provides directions to the radar tracker 105 which causes the successive search beams to scan the field of regard and continuously finds new targets, and updates existing targets.

16. The Radar Tracker and Data Base 105 sends track data and AIS data to the Beam Dwell Scheduler.

17. Beam Dwell Scheduling is accomplished by the Beam Dwell Scheduler 107. The Dwell Scheduler 107 prioritizes & selects the target or region to be imaged. The beam dwell scheduler 107 uses the track data provided by the surveillance processor plus externally available data—like automatic identification system (AIS)—to establish the ISAR priority. When AIS data is not available a series of short (<100 msec) high range resolution dwells are used in place of ISAR to provide additional information in support of target ISAR prioritization. With respect to a maritime surveillance mission, there are typically hundreds of targets to be imaged and classified. ISAR imaging has constraints such as Target Orientation, Target Behavior and Radar Horizon Effects, that must be considered in choosing the priority. For proper classification the Radar Track must be converged meaning the target course and speed are within the desired accuracies. The beam dwell scheduler takes these factors into consideration when prioritizing the imaging schedule. Note that the operator can select a target at any time and it will be placed on the top of the priority list.

Figure 9:
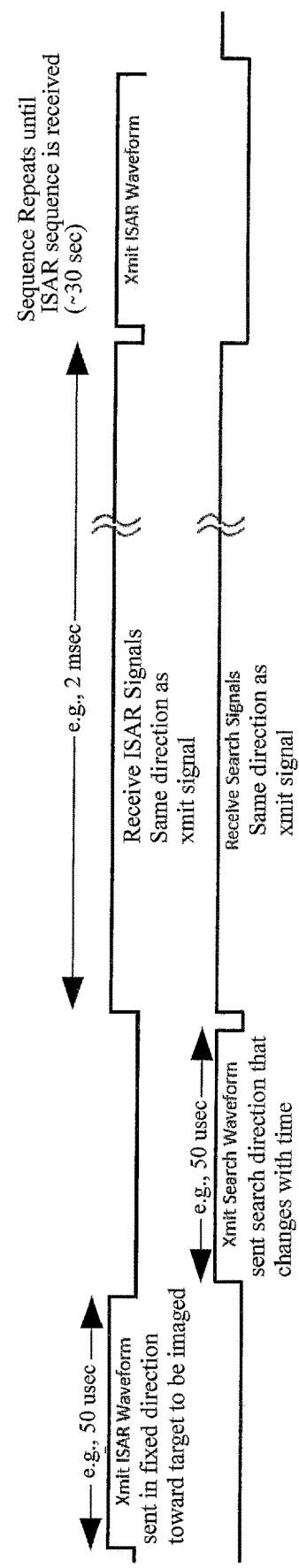
FIG. 9 shows an exemplary timing diagram of the Search Transmissions and ISAR transmissions.

A description of the dual beam transmit and receive sequences follows. The Timing Synchronizer 109 is the key to the two modes successfully operating simultaneously. The Timing Synchronizer 109 determines when to transmit the radar signals. Typically for Search and Imaging the transmission rate is on the order of 500 Hz but can range from 400 to 2500 Hz. At any time the radar can be in either transmit or receive using transmit/receive switches 115, 215, which is controlled by the Timing Synchronizer 109 (although a control line is not shown in FIG. 1 between the timing synchronizer and the transmit/receive switches). Transmit time is typically 5% to 10% of the time between transmit pulses. So the system may transmit for a short time and receive for a long time. The Timing Synchronizer 109 sends a trigger to waveform generator 110 and that starts the transmit sequence for the Imaging Waveform. While this is going on both of the transmit/receive switches 115 and 215 are in transmit mode but only 110 is active. When 110 finishes the Imaging waveform then the Timing Synchronizer 109 sends a trigger to 215 to start the Search Mode Waveform. When the Search Mode Waveform is complete then 115/215 are set to the receive state. Note that in one embodiment, the Search Waveform cannot be created/transmitted simultaneously, and is instead transmitted after the Imaging Waveform is finished (see FIG. 9), because the transmitter is a non-linear device (it runs in saturation) and does not preserve the two waveform's amplitude and phase—the transmitter used may be a non-linear device to maximize transmit power. As seen in the timing diagram of FIG. 9, the system first transmits the ISAR Waveform and then the Search waveform. As soon as the Search waveform transmission is completed the system may switch to a Search receive mode. For ISAR however, the ISAR receive mode can't start until the Search waveform transmission is completed. This has a minor impact on the ISAR minimum range (~5 NM) that is not a factor operationally since ISAR Imaging is generally performed for long range ships that are beyond visual line of sight by the flight crew or their EO/IR equipment. The time to transmit the next ISAR waveform occurs after the max range signal is received by the Search beam to insure the search receive time is not interrupted by the next ISAR transmission.

At 101 and 201, prior to transmit time, all phase shifters 131, 132, 231, 232 plus the N minus 2 other elements not shown are setup by the Beam Steering Computer 108 to apply a delay to the signal. The delay is a function of the RF Carrier Frequency (f) and the distance between the elements (d). For a 1 dimensional array the phase shifter angle φ is equal to Δphase Az=(d)(f)/(c)(sin (ΘAz))), where c is the speed of light and Θ is the desired pointing direction, f is the RF frequency and d is the element spacing. Θ1 is the desired pointing direction for the Imaging Waveform and is used by the Beamsteering Computer 108 to calculate the phase shift values for 131, 231 plus the N minus 2 other elements not shown. Θ2 is the desired pointing direction for the Search Waveform and is used by the Beamsteering Computer 108 to calculate the phase shift values for 132, 232 plus the N minus 2 other elements not shown.

At 120 and 220 the following occurs during transmit and receive. During Imaging Waveform transmit time the waveform is distributed by the Beamformer 120 to each element arriving at N phase shifters of which only two are shown— 131, 231. During Search Waveform transmit time the waveform is distributed by the Beamformer 220 to each element arriving at N phase shifters of which only two are shown— 132, 232. The two waveforms are transmitted sequentially to preserve their amplitude and phase. In FIG. 1, the ISAR waveform 120Ti, 120Tii plus all the elements not shown is transmitted first. The beamformer (120) simply divides the transmit signal into N versions that feed the phase shifters 131, 231, and the N minus 2 phase shifters not shown. After the ISAR waveform is generated, the Search Waveform 220Ti, 220Tii plus all the elements not shown is divided by beamformer (220) into N versions that feed the phase shifters 132, 232, and all the N minus 2 phase shifters not shown.

At 101 and 201 when the Imaging Transmit signal is received from Beamformer 120 it is delayed by the phase shifters 131, 231 plus the N minus 2 elements not shown by applying the preloaded phase shift from Beamsteering Computer 108. The phase shifted transmit signal is then sent to the TRM's 140, 240 plus the N minus 2 elements not shown where amplification is applied to produce a high power signal (131T, 231T) that is then radiated by the antennas 150, 250 plus the N minus 2 elements not shown. Note the antennas 150, 250 also receive a timing signal from the Timing Synchronizer 109 that is not shown, which tells the TRM whether to be in transmit or receive mode.

At 101 and 201 when the Search Transmit signal received from Beamformer 220 it is delayed by the phase shifters 132, 232 plus the N minus 2 elements not shown by applying the preloaded phase shift from Beamsteering Computer 108. The phase shifted transmit signal is then sent to the TRM's 140, 240 plus N minus 2 elements not shown, where amplification is applied to produce a high power signal (132T, 232T) that is then radiated by the antennas 150, 250 plus the N minus 2 elements not shown.

When the Search Mode transmission ends, the Timing Synchronizer 109 triggers the transmit/receive switches 115, 215, and the TRM's 140 and 240 to switch into a receive mode. Signals are then received by the antennas 150, 250 plus the N minus 2 elements not shown. Phase shifters 131 and 231 use the same phase shift values that were used on transmit so the sum (performed by 120) of all the elements form a receive beam in the direction that the ISAR waveform was sent. Likewise Phase shifters 132 and 232 use the same phase shift values that were used on transmit so the sum (performed by 220) of all the elements form a receive beam in the direction that the Search waveform was sent.

Beamformer 120 supplies the received ISAR signal to the receiver 111 to convert the signal to baseband where it is applied to the Image Processor 104. Note the received signal out of 111 are high range resolution returns off the ship being imaged. Beamformer 220 supplies the received Search signal to the receiver 211 to convert the signal to baseband where it is applied to the Surveillance Processor 106. Note the received signal out of 211 are the returns off of ships that are used for detection and tracking in 106.

That completes the description of the dual beam transmit and receive sequences.

It should be noted that other implementations may be performed by the same arrangement, and which may differ slightly but be functionally the same. For example, one difference starts at the waveform generator where outputs from 110 and 210 may be combined so a single time multiplexed output is sent to Beamformer #1 120 containing both Imaging and Search waveforms sent sequentially like before but now on one line. Phase shifter 131 and 231 have 2 memories that get loaded with the desired phase shift values for Imaging and for Search by Beamsteering Computer 108. The Phase shifters 131 and 231 also receive a timing signal from the Timing Synchronizer 109 to inform it which waveform (Imaging or Search) is present so the correct phase shift can be applied. The Imaging and Search Transmit waveforms are therefore time multiplexed on 131T and 231T. On receive Phase Shifters 131 and 231 are set to receive in the direction of the Imaging signals while Phase Shifters 132 and 232 are set to receive in the direction of the Search signals.

Figure 2:
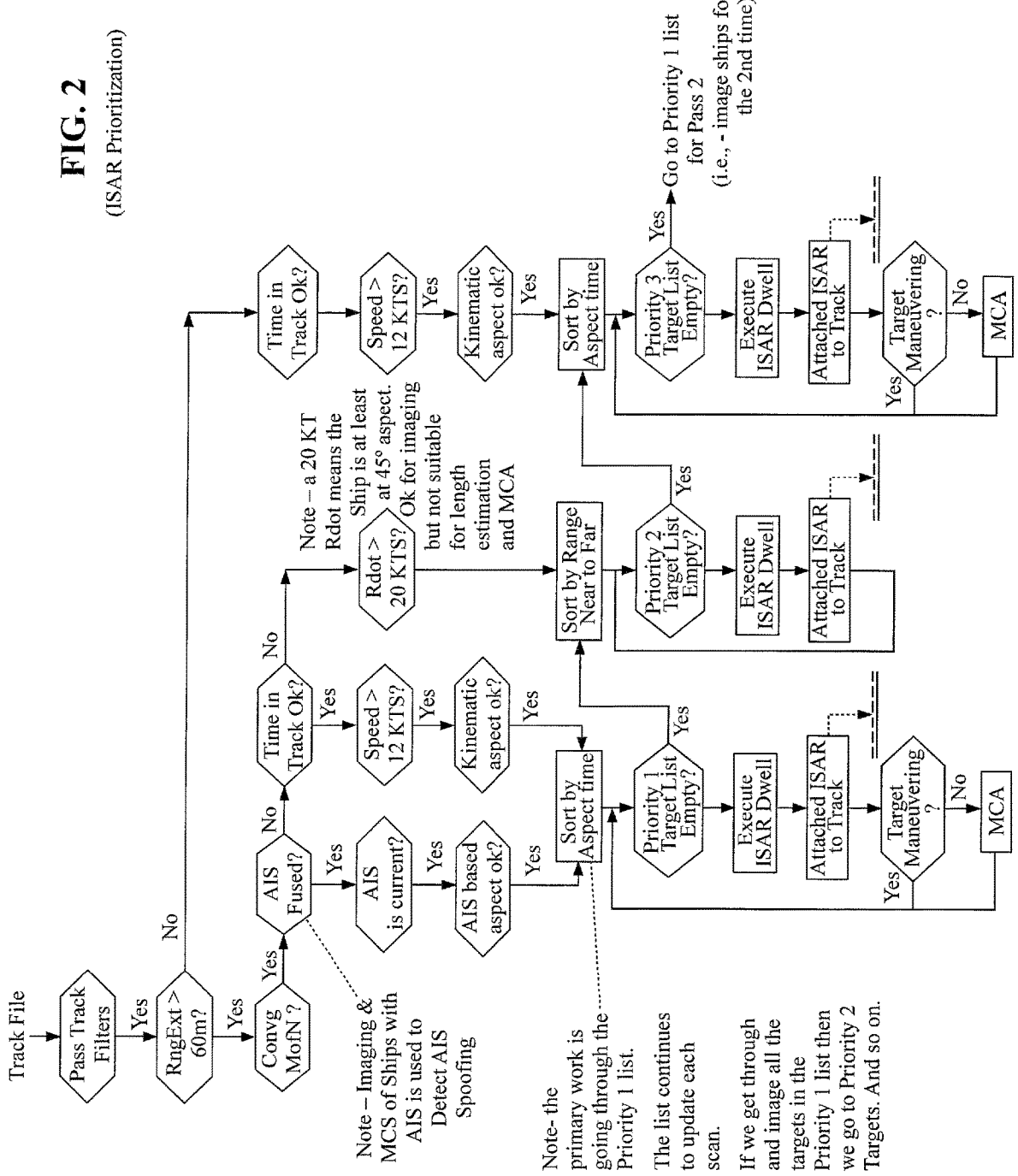
FIG. 2 is a flow chart showing an ISAR prioritization scheme by the radar system of FIG. 1.
Figure 6:
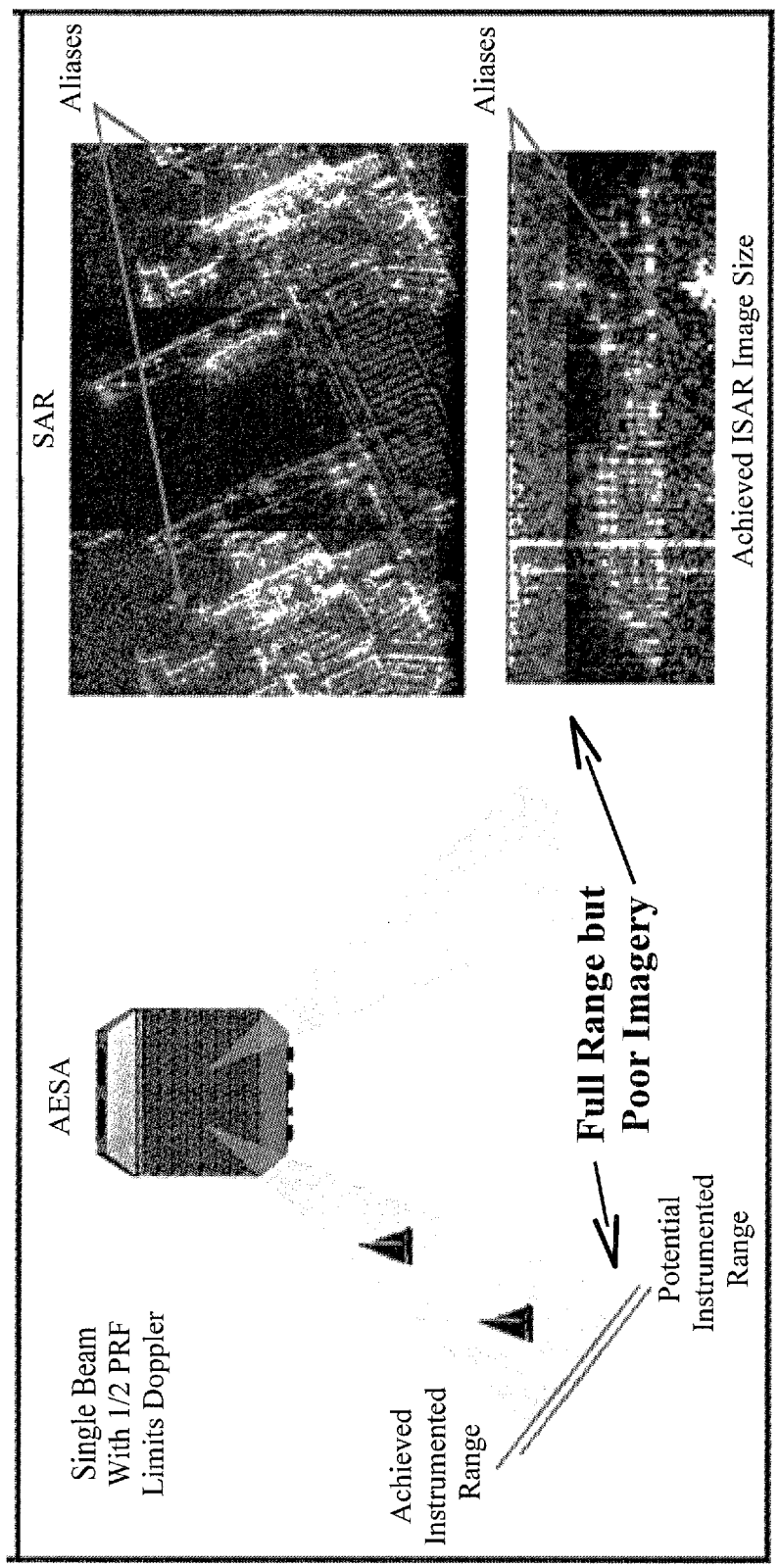
FIG. 6 shows a series of images illustrating the poor imaging that results from a single beam radar, and which corresponds to the chart of FIG. 4.
Figure 7:
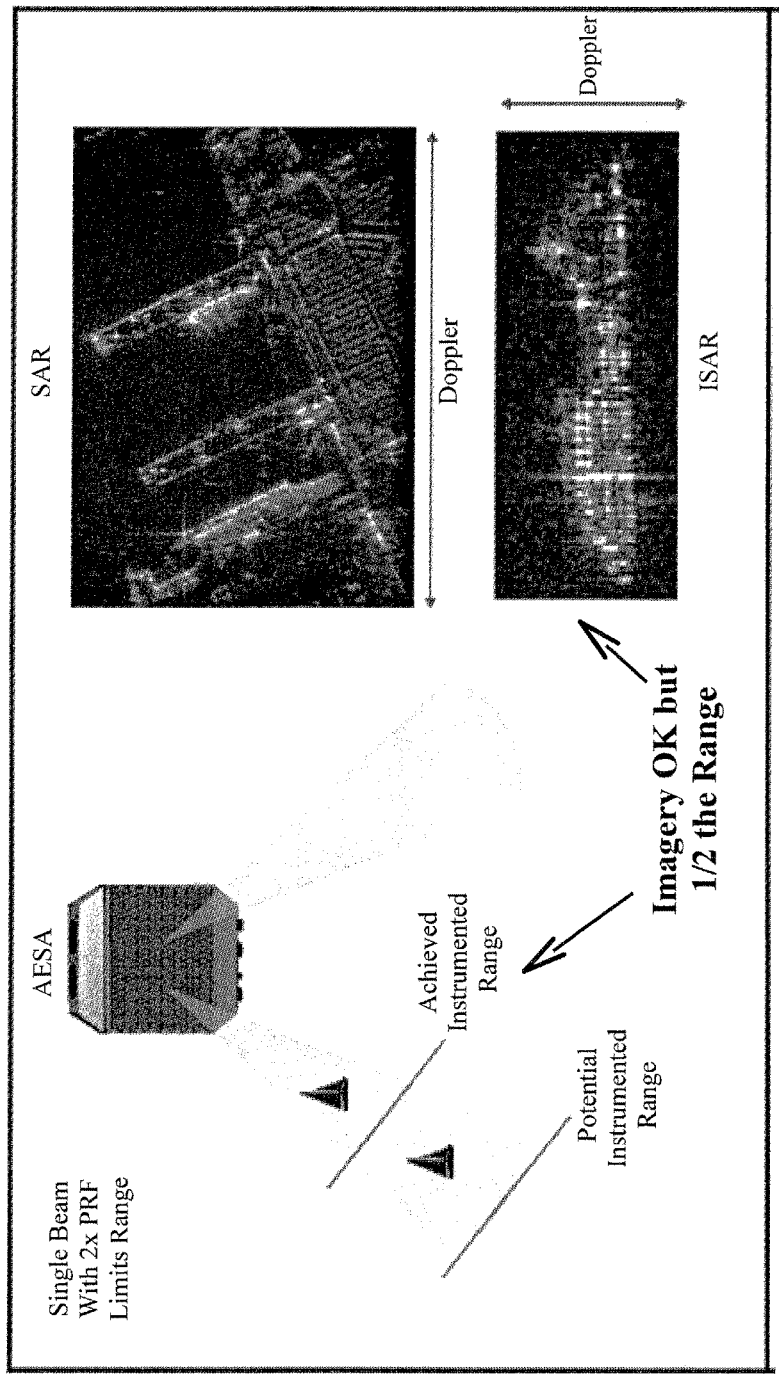
FIG. 7 shows a series of images illustrating the reduced range that results from a single beam radar in order to achieve satisfactory image quality, and which corresponds to the chart of FIG. 5.
Figure 8B:
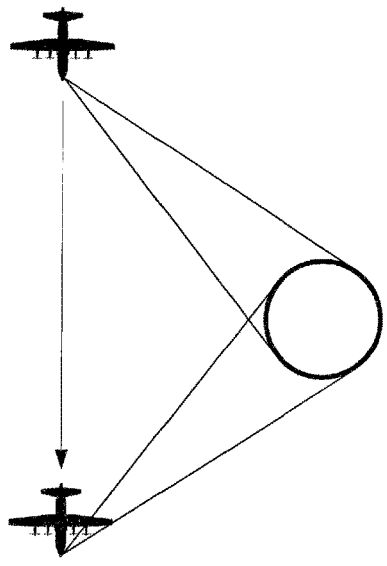
FIG. 8B shows an aircraft creating a SAR mode spotlight.
Figure 8C:
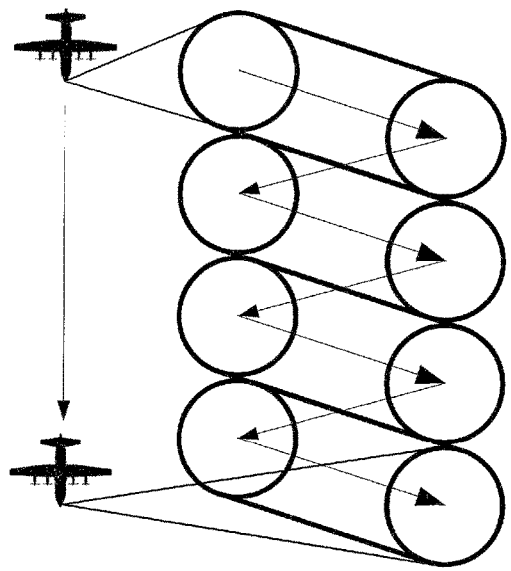
FIG. 8C shows an aircraft creating a SAR mode scan.
Figure 8A:
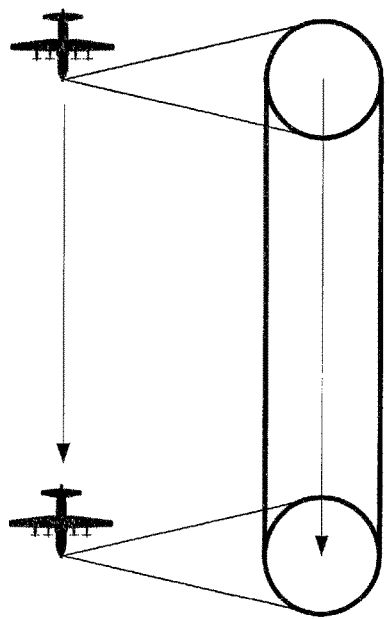
FIG. 8A shows an aircraft creating a SAR mode strip map.

FIG. 2 shows an ISAR prioritization scheme that is described further.

The radar tracker and Database 105 main function is to form tracks from the detections provided by the surveillance processor 106. The detections include ships as well as detections from noise and sea clutter. The radar tracker and Database 105 first performs a tentative track process that associates detections from scan to scan into individual tracks. For each individual track, a blip-scan metric is maintained based on the number of scans with a detection divided by the number of scans since the first detection. Noise and Clutter tracks will not persistently associate over a long period of time while ships will last. Tentative tracks with low blip-scan ratio are discarded while those with a high blip-scan ratio are promoted to firm tracks. This process takes about 20 to 40 seconds for a new detection to become a firm track.

Once a second, all the firm tracks are provided to the Beam Dwell Scheduler 107. Track Data consists of the Latitude/Longitude/Course/Speed and a covariance matrix that contains the accuracy of the Latitude/Longitude/Course/Speed. Also provided is the ships range extent.

The international maritime organization (IMO) requires certain ships to carry AIS Transponders. These devices broadcast in the VHF frequency band. The regulation requires AIS to be fitted aboard all ships of 300 gross tonnage and upwards engaged on international voyages, cargo ships of 500 gross tonnage and upwards not engaged on international voyages, and all passenger ships irrespective of size. AIS signals are received via a VHF antenna not shown in FIG. 1. The AIS signals contain ship identification information as well as Latitude/Longitude/Course/Speed. The tracker 104 associates AIS Latitude/Longitude/Course/Speed data with the radar Latitude/Longitude/Course/Speed allowing the AIS information to be attached to the radar firm track.

The AIS signals are easily spoofed so the AIS identification field may not be reliable so another key capability of this system is to use ISAR mode with Maritime Classification Aids (MCA p/o 104) to confirm the AIS reported identification. The AIS Latitude/Longitude/Course/Speed information is used in the Beam Dwell Scheduler 107 as part of the prioritization scheme depicted in FIG. 2.

A priority list of ships to image is maintained in the Beam Dwell Scheduler 107. The ship at the top of the list is imaged next and its location relative to the platform is provided in the Beamsteering Computer 108. This is used to point the next ISAR dwell. An ISAR dwell takes anywhere from 20 to 60 seconds as a series of ISAR image frames are generated (Image Processor and Classifier 104) that capture the ships pitch/roll/yaw cycle. The maritime classification aids in the Image Processor and Classifier 104 select the best ISAR image frames and matches it to an internal world-wide ship library. The best ISAR image and the MCA classification is provided to the Radar Tracker and Data Base 105 and is attached to the firm track. This MCA classification is used to select the display track symbology and the best ISAR image can be viewed by the operator by selecting the track on the Display and Operator Interface 103. Note that new firm tracks require time for the course/speed to converge. Convergence time increases with target range. Accurate course/speed is required to determine the ships aspect angle relative to the platform and is one of the criteria used in prioritizing which ship to image next in the Beam Dwell Scheduler 107.

Not shown in FIG. 1 is the Platform Navigation data, which is received from the onboard GPS/Inertial Navigation system. This data allows the radar to adjust for platform attitude/altitude and remove platform motion for ISAR Image generation (Image Processor and Classifier 104), Tracking Geolocation (Radar Tracker and Data Base 105), PPI Display (Surveillance Processor 106), calculation of ship aspect angle (Beam Dwell Scheduler 107), and array pointing (Beamsteering Computer 108).

Since AIS data is generally not available on combatants, the herein disclosed radar system may also include a pre-screening function in the Image Processor and Classifier 104 that uses short ISAR Dwells (<1 second) to obtain an accurate range extent, which in turn is converted to Ship Length Estimate in the Radar Tracker and Data Base 105. The short ISAR dwells are scheduled by the Beam Dwell Scheduler 107 after a new Firm Track is formed and the track is converged. Ship lengths that should have AIS reports but do not are then high priority candidates for full ISAR dwells and subsequent classification by MCA.

Figure 10:
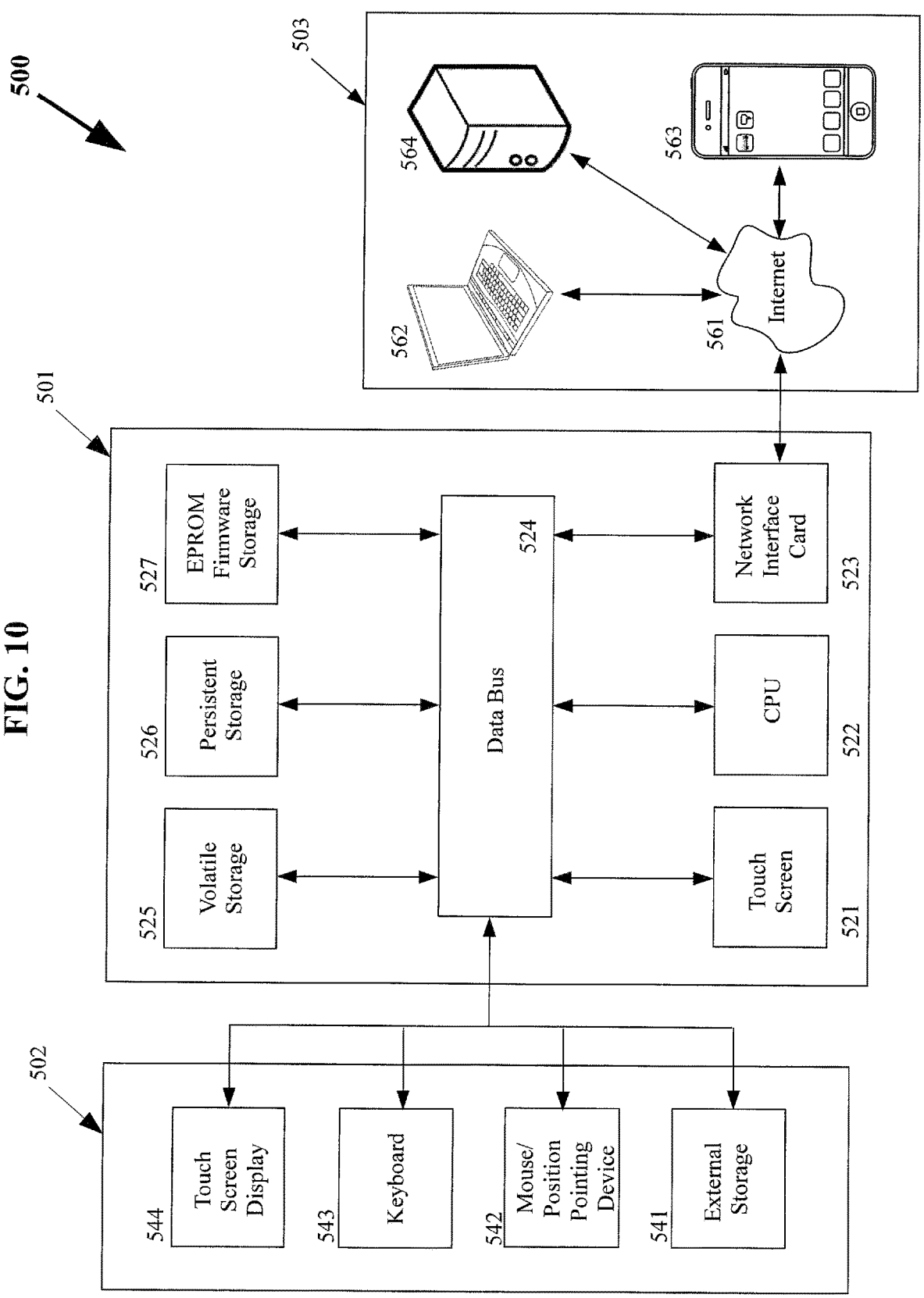
FIG. 10 is a schematic showing an exemplary computing unit capable of being programmed with the instructions of software that may be utilized herein.

Software of the present invention may run on a suitable computing device, so a description of such an exemplary computer system is hereinafter disclosed. Exemplary computer system 500 (i.e., a client device associated with a particular user) is shown schematically in FIG. 10 and which may comprise computing unit 501 interacting with external peripherals 502, such as a separate touch screen display 544, and interacting with network resources 503, including use of the internet 561, and other computers (or other client devices or a server), which may be a laptop computer 562 (i.e., a second client device associated with a second user), a smart phone 563 (i.e., a third client device associated with a third user), a server 564, etc.

The computing unit 501 may include a data bus 524 for communicating information across and among various parts of computing unit 501, and a central processing unit, which may be a microprocessor (hereinafter "processor" or "CPU") 522 coupled with a bus 524 for processing information and performing other computational and control tasks. Computing unit 501 may also include a volatile storage 525, such as a random access memory (RAM) or other dynamic storage device, coupled to bus 524 for storing various information as well as instructions to be executed by processor 522. The volatile storage 525 may also be used for storing temporary variables or other intermediate information during execution of instructions by processor 522. Computing unit 501 may further include a read only memory (ROM) or an erasable programmable memory (EPROM) 527 or other static storage device coupled to bus 524 for storing static information and instructions for processor 522, such as basic input-output system (BIOS), as well as various system configuration parameters. A persistent storage device or non-volatile memory 526, such as a magnetic disk, optical disk, or solid-state flash memory device may be provided and may be coupled to bus 524 for storing information and instructions.

Computing unit 501 may be coupled via bus 524 to an integral display 521, possibly a touch-screen display, for use in displaying information to a user. If desired, computing unit 501 may be coupled via bus 524 to an external display screen 544. An external input device 543 (e.g., a standard keyboard) may be coupled to bus 524 for communicating information and command selections to processor 522. A cursor control device 542, such as a mouse, a trackball, or cursor direction keys, may be used for communicating direction information and command selections to processor 522 and for controlling cursor movement on display 544. An external storage device 541 may be connected to the computing unit 501 via bus 524 to provide an extra or removable storage capacity for the computing unit 501, which may be used to facilitate exchange of data with other computer systems.

Some of the techniques herein may be performed by computing unit 501 in response to processor 522 executing one or more sequences of one or more instructions contained in the volatile memory 525. Execution of the sequences of instructions contained in a non-transitory memory may cause processor 522 to perform the process steps described herein. In alternative embodiments, specific hard-wired digital circuitry may be used in place of, or in combination with, software instructions to implement the invention.

The term "computer-readable medium" as used herein refers to any medium that participates in providing instructions to processor 522 for execution. The computer-readable medium is just one example of a machine-readable medium, which may carry instructions for implementing any of the methods and/or techniques described herein. Various forms of computer readable media may contain one or more sequences of one or more instructions for the processor 522 to execute, including non-volatile media (storage device 526), and volatile media (storage device 525). Common forms of computer-readable media include, for example, a floppy disk, a hard disk, magnetic tape, or any other magnetic medium, a CD-ROM, a flash drive, and a memory card.

The computing unit 501 may thus also include a communication interface, such as network interface card 523 coupled to the data bus 522. Communication interface 523 may provide a two-way data communication coupling to a network link that may be connected to a local network. For example, communication interface 523 may be an integrated services digital network (ISDN) card or a modem to provide a data communication connection to a corresponding type of telephone line, or it may be a local area network interface card (LAN NIC) to provide a data communication connection to a compatible LAN.

Network link 523 also typically provides data communication to other network resources. For example, the network link may provide a connection over the internet 561 to the world-wide-web. Thus, the computing unit 501 can access resources located anywhere using the Internet 561. Also, the computing unit 501 may also be accessed by, or communicate with, other computers (e.g. 562), or another smart device (e.g., smartphone 563), generally with permission, and which may be located anywhere with access to the internet 561.

While illustrative implementations of one or more embodiments of the disclosed system are provided hereinabove, those skilled in the art and having the benefit of the present disclosure will appreciate that further embodiments may be implemented with various changes within the scope of the disclosed system. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A radar system configured to provide a continuous imaging mode and simultaneously provide an uninterrupted search mode that maintains imaging doppler bandwidth and maximum range capability, said radar system comprising:
   a first waveform generator configured to generate a first radar signal at a first frequency;
   a first beam former configured to constitute the first radar signal;
   a second waveform generator configured to generate a second radar signal at a second frequency;
   a second beam former configured to constitute the second radar signal;
   a first beam receiver;
   a second beam receiver;
   an array of transmit receive modules, each transmit receive module comprising:
      an electronic scanning antenna;
      a first phase shifter;
      a second phase shifter; and
      a transmitter/receiver configured to selectively transmit a phase-shifted radar signal to said electronic scanning antenna;
   a timing synchronizer configured to synchronize signal generation by each of said first waveform generator and said second waveform generator, to ensure that the first radar signal and the second radar signal can be transmitted and received without interfering with each other;
   wherein said array of transmit receive modules are selectively interconnected, whereby said first beam former is configured to transmit the constituted first radar signal to said first phase shifter of at least a first transmit receive module of said array of transmit receive modules and to said first phase shifter of at least a second transmit receive module of said array of transmit receive modules, and whereby said second beam former is configured to transmit the constituted second radar signal to said second phase shifter of at least said first transmit receive module of said array of transmit receive modules and to said second phase shifter of at least said second transmit receive module of said array of transmit receive modules;
   wherein said first beam receiver is configured to receive a radar return from said electronic scanning antenna of at least said first transmit receive module for said imaging mode; and
   wherein said second beam receiver is configured to receive a radar return from said electronic scanning antenna of at least said second transmit/receive module and be used for said uninterrupted search mode; and
   wherein said array of transmit receive modules being selectively interconnected are thereby configured to image while scanning, being configured to continuously track one or more targets and to simultaneously acquire images for classification purposes.

2. The radar system according to claim 1, wherein said array comprises an n by m array, being configured to image in both azimuth and elevation.

3. The radar system according to claim 2, wherein said n by m array comprises a one by two array of said transmit receive modules.

4. The radar system according to claim 2, wherein said n by m array comprises a forty-eight by sixteen array of said transmit receive modules.

5. The radar system according to claim 2, further comprising:
   an image processor, said image processor configured to receive high range resolution coherent signal and produce focused range/doppler images of the one or more targets;
   a radar tracker configured to cause successive search beams to scan the surveillance area and continuously find new targets, and update each previously detected one or more targets;
   a surveillance processor, said surveillance processor configured to perform automatic detection and tracking of a search beam signal, and to provide directions to said radar tracker for successive search beams.

6. The radar system according to claim 5, further comprising:
   a display and operator interface (103) configured to permit manual classification of the new target.

7. A radar system comprising:
   a first transmit/receive module (101);
   a second transmit/receive module (201):
   wherein said first transmit/receive module (101) and said second transmit/receive module (201) are selectively interconnected and thereby configured to image while scanning, being configured to continuously track one or more targets and to simultaneously acquire images for classification purposes;
   wherein said first transmit/receive module (101) comprises:
      an electronic scanning antenna (150);
      a transmitter/receiver (140);
      a first phase shifter (131); and
      a second phase shifter (132);
   a first waveform generator (110);
   a first beam former (120);
   a first transmit/receive switch (115);
   a first beam receiver (111);
   wherein said second transmit/receive module (201) comprises:
      an electronic scanning antenna (250);
      a transmitter/receive (240);
      a first phase shifter (231); and
      a second phase shifter (232);
   a second waveform generator (210);
   a second beam former (220);
   a second transmit/receive switch (215);
   a second beam receiver (211);

wherein said first waveform generator (110) is configured to generate a first radar signal at a first frequency, the first radar signal being transmitted to said first beam former (120);

wherein said second waveform generator (210) is configured to generate a second radar signal at a second frequency, the second radar signal being transmitted to said second beam former (220);

wherein said first beam former (120) is configured to constitute the first radar signal;

wherein said second beam former (220) is configured to constitute the second radar signal;

wherein said first phase shifter (131) of said first transmit/receive module (101) is configured to receive and to adjust a phase of the constituted first radar signal;

wherein said second phase shifter (132) of said first transmit/receive module (101) is configured to receive and to adjust a phase of the constituted second radar signal;

wherein said first phase shifter (231) of said second transmit/receive module (201) is configured to receive and to adjust a phase of the constituted first radar signal;

wherein said second phase shifter (232) of said second transmit/receive module (201) is configured to receive and to adjust a phase of the constituted second radar signal;

wherein said first transmit/receive switch (115) is configured to control transmissions from said first waveform generator (110) to said first beam former (120) and control receptions from said first waveform generator (110) to said first beam receiver (111);

wherein said second transmit/receive switch (215) is configured to control transmissions from said second waveform generator (210) to said second beam former (220) and control receptions from said second waveform generator (210) to said second beam receiver (211);

a timing synchronizer (109) configured to synchronize generation of the first radar signal by said first waveform generator (110) with generation of the second radar signal by said first waveform generator (210), to ensure that the first radar signal and the second radar signal can be transmitted and received without interfering with each other; and wherein said first transmit/receive module (101) and said second transmit/receive module (201) are thereby configured to image while scanning, being configured to continuously track one or more targets and to simultaneously acquire images for classification purposes.

8. The radar system according to claim 7, further comprising:
a beam steering computer (108) configured to control and apply a delay for signal transmission for each of said first phase shifter (131), said second phase shifter (132), said first phase shifter (231), and said second phase shifter (232); and
wherein each delay is function of an RF carrier frequency (f), and a distance (d) between said first transmit/receive module (101) and said second transmit/receive module (201).

9. The radar system according to claim 8, further comprising:
an image processor (104), said image processor configured to receive high range resolution coherent signal and produce focused range/doppler images of the one or more maneuvering targets;

a radar tracker (105) configured to cause successive search beams to scan the surveillance area and continuously find new targets, and update each previously detected target;

a surveillance processor (106), said surveillance processor configured to perform automatic detection and tracking of a search beam signal, and to provide directions to said radar tracker (105) for the successive search beams.

10. The radar system according to claim 9, further comprising:
a display and operator interface (103) configured to permit manual classification of the new target by an operator.

11. The radar system according to claim 10, further comprising:
a maritime classification aid configured to provide automatic classification of the new target.

12. The radar system according to claim 11, wherein said image processor is configured to produce the focused range/doppler images of the target in the form of a movie.

13. The radar system according to claim 12, further comprising:
a plurality of additional transmit/receive modules formed into an array; and
wherein said array of transmit/receive modules comprises an n by m array, being configured to image in both azimuth and elevation.

14. The radar system according to claim 13, wherein said n by m array comprises a one by two array of said transmit/receive modules.

15. The radar system according to claim 13, wherein said n by m array comprises a forty-eight by sixteen array of said transmit-receive modules.

16. A radar system configured to continuously image and simultaneously search uninterrupted, said radar system comprising:
a first waveform generator configured to generate a first radar signal at a first frequency;
a first beam former configured to constitute the first radar signal;
a second waveform generator configured to generate a second radar signal at a second frequency;
a second beam former configured to constitute the second radar signal;
a first beam receiver;
a second beam receiver;
an array of transmit receive modules, each transmit receive module comprising:
an electronic scanning antenna;
a first phase shifter;
a second phase shifter; and
a transmitter/receiver configured to selectively transmit a phase-shifted radar signal to said electronic scanning antenna;
wherein said array of transmit/receive modules are selectively interconnected, whereby said first beam former is configured to transmit the constituted first radar signal to said first phase shifter of at least a first transmit receive module of said array of transmit receive modules and to said first phase shifter of at least a second transmit receive module of said array of transmit receive modules, and whereby said second beam former is configured to transmit the constituted second radar signal to said second phase shifter of at least said first transmit receive module of said array of transmit receive modules and to said second phase shifter of at least said second transmit receive module of said array of transmit receive modules;

a timing synchronizer configured to synchronize signal generation by said first waveform generator and said second waveform generator, to ensure that the first radar signal and the second radar signal can be transmitted and received without interfering with each other;

wherein said array of transmit/receive modules are thereby configured to continuously track one or more maneuvering targets and to simultaneously acquire images for classification purposes.

17. The radar system according to claim 16, further comprising:

a beam steering computer (108) configured to control and apply a delay for signal transmission for each of said first phase shifter (131), said second phase shifter (132), said first phase shifter (231), and said second phase shifter (232).

18. The radar system according to claim 17, further comprising:

an image processor (104), said image processor configured to receive high range resolution coherent signal and produce focused range/doppler images of the one or more maneuvering targets;

a radar tracker (105) configured to cause successive search beams to scan the surveillance area and continuously find new targets, and update each previously detected target;

a surveillance processor (106), said surveillance processor configured to perform automatic detection and tracking of a search beam signal, and to provide directions to said radar tracker (105) for the successive search beams.

19. The radar system according to claim 18, further comprising:

a display and operator interface (103) configured to permit manual classification of the new target by an operator; and a maritime classification aid configured to provide automatic classification of the new target.

20. The radar system according to claim 19, wherein said image processor is configured to produce the focused range/doppler images of the target in the form of a movie.

* * * * *